US009681718B1

(12) United States Patent
Poole et al.

(10) Patent No.: US 9,681,718 B1
(45) Date of Patent: Jun. 20, 2017

(54) COMBINED DEVICE MOUNT AND PROTECTIVE CASE

(71) Applicants: Timothy E. Poole, Virginia Beach, VA (US); Craig Dean, Virginia Beach, VA (US)

(72) Inventors: Timothy E. Poole, Virginia Beach, VA (US); Craig Dean, Virginia Beach, VA (US)

(*) Notice: Subject to any disclaimer, the term of this patent is extended or adjusted under 35 U.S.C. 154(b) by 0 days.

(21) Appl. No.: 14/940,637

(22) Filed: Nov. 13, 2015

Related U.S. Application Data

(60) Provisional application No. 62/158,447, filed on May 7, 2015.

(51) Int. Cl.
*A45C 11/00* (2006.01)
*A45C 13/00* (2006.01)

(52) U.S. Cl.
CPC ............ *A45C 11/00* (2013.01); *A45C 13/005* (2013.01); *A45C 2011/001* (2013.01); *A45C 2011/002* (2013.01)

(58) Field of Classification Search
CPC . A45C 11/00; A45C 13/005; A45C 2011/001; A45C 2011/002

USPC ......... 206/305, 320; 220/480, 481; 248/683; 361/683; 455/90.3, 575.1, 575.8
See application file for complete search history.

(56) References Cited

U.S. PATENT DOCUMENTS

| | | | | |
|---|---|---|---|---|
| 3,881,649 A * | 5/1975 | Krautsack | ............ | B65D 5/4208 206/460 |
| 8,302,769 B2 * | 11/2012 | Justiss | ....................... | A45F 5/02 206/320 |
| 8,857,687 B1 * | 10/2014 | An | ......................... | B60R 11/02 224/282 |
| 2014/0183065 A1 * | 7/2014 | Toulotte | ................. | A45C 11/00 206/37 |
| 2016/0150861 A1 * | 6/2016 | Yao | ........................ | A45C 11/00 224/245 |

* cited by examiner

*Primary Examiner* — Bryon Gehman
(74) *Attorney, Agent, or Firm* — Law Office of Jerry Joseph, PLC; Jerry K. Joseph

(57) ABSTRACT

A combined mount and protective case apparatus for an electronic device which includes a protective housing member to store and protect an electronic device and an attachment arm member having one or more adhesive portions configured to detachably mount to a plurality of surfaces, the attachment arm member rotatably connected to the protective housing member by a hinge member coupled to the protective housing member.

14 Claims, 3 Drawing Sheets

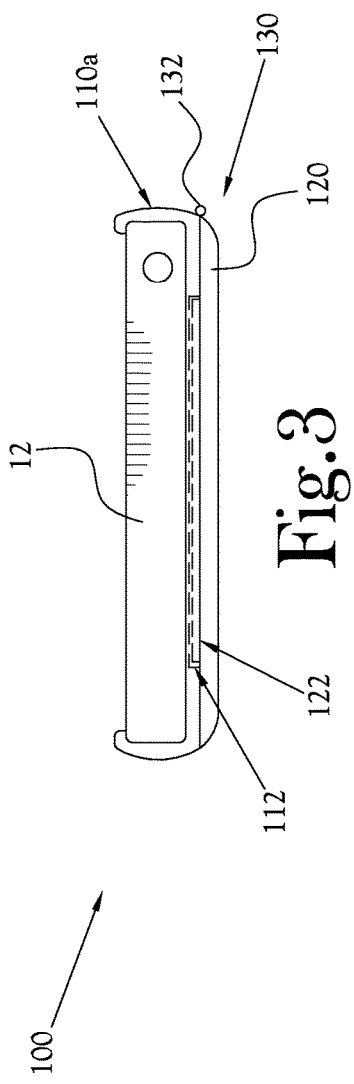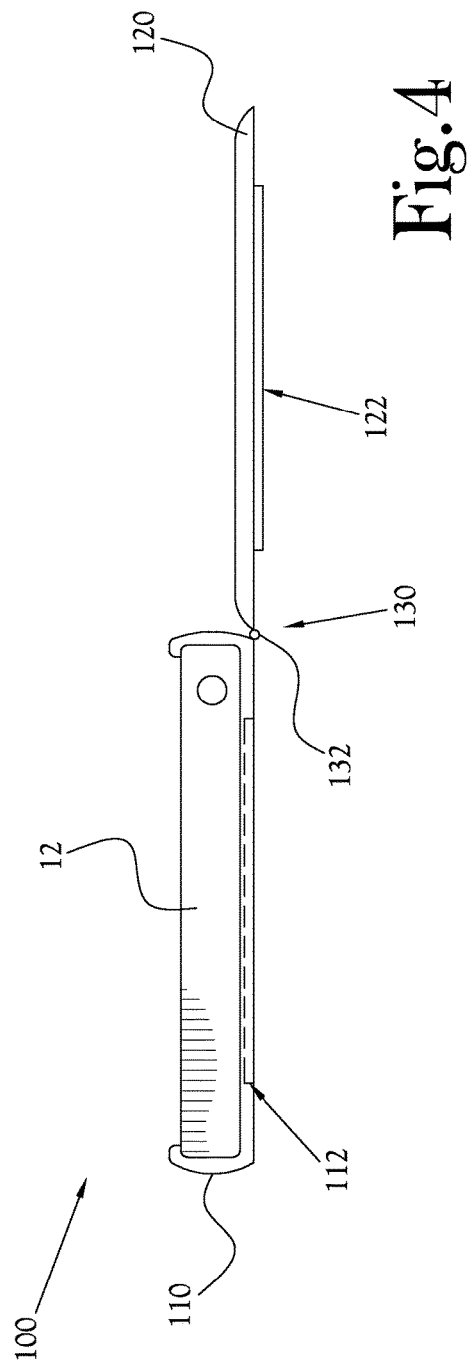

COMBINED DEVICE MOUNT AND PROTECTIVE CASE

CROSS-REFERENCE

This application claims the benefit under 35 U.S.C 119 (e) of U.S. Provisional Patent Application No. 62/158,447, filed on May 7, 2015, the contents of which is incorporated by reference in its entirety.

FIELD OF INVENTION

The present general inventive concept relates generally to a protective case for a portable electronic device, and more particularly, to a combined device mount and protective case for a portable electronic device that is removably attachable to a plurality of surfaces to allow for hands-free operation of the stored electronic device.

BACKGROUND

Over the years, various types of electronic devices have been developed which integrate several features and functions, including phones, cameras, music players, and video players into a single convenient hand-held device. As a result, many users have incorporated these devices in all aspects of their lives including work and entertainment purposes.

However, these devices often require a user to continuously hold the device in a particular orientation to either take a group photo or to watch a video. Therefore, what is desired is a mount which may be temporarily secured to a surface to support an electronic device in a desired orientation to allow a user hands-free operation of the electronic device.

BRIEF SUMMARY

Features and/or utilities of the present general inventive concept provide a combined mount and protective case apparatus for an electronic device which includes a protective housing member to store and protect an electronic device and an attachment arm member having one or more adhesive portions configured to detachably mount to a plurality of surfaces, the attachment arm member rotatably connected to the protective housing member by a hinge member coupled to the protective housing member.

The hinge member may rigidly support the attachment member at a plurality of positions between the open and closed position.

The protective housing member may include a recess to enclose the one or more adhesive portions.

The attachment arm member may rotate between an open position to expose the one or more adhesive portions and a closed position to seal off the one or more adhesive portions from an external environment.

The one or more adhesive portions of the attachment arm member may be enclosed within the recess of the protective housing when the attachment arm member is in the closed position.

The one or more adhesive portions of the attachment arm member may be exposed to an external environment when the attachment arm member is in open position.

Features and/or utilities of the present general inventive concept also provide a combined mount and protective case apparatus for an electronic device which includes a protective housing member to store and protect an electronic device and an attachment arm member having one or more adhesive portions configured to detachably mount to a plurality of surfaces, the attachment arm member slidably connected to the protective housing member by a coupling member coupled to the protective housing member.

The coupling member may rigidly support the attachment member at a plurality of positions between the open position and the closed position.

The protective housing member may include a recess to enclose the one or more adhesive portions.

The attachment arm member may slide between a closed position and an open position.

The one or more adhesive portions of the attachment arm member may be enclosed within the recess of the protective housing when the attachment arm member is in the closed position.

The one or more adhesive portions of the attachment arm member may be exposed to an external environment when the attachment arm member is in open position.

Features and/or utilities of the present general inventive concept provide a method of using a combined mount and protective case apparatus for an electronic device having a protective housing member to store and protect an electronic device and an attachment arm member having one or more adhesive portions configured to detachably mount to a plurality of surfaces, the attachment member movably connected to the protective housing member by a coupling member coupled to the protective housing member, which includes moving the attachment arm member in a direction opposite of the protective housing member, placing the one or more adhesive portions against a planar surface and applying a pressure or force to the one or more adhesive portions to detachably secure the protective housing member to the planar surface.

The protective housing member may include a recess to enclose the one or more adhesive portions.

The attachment arm member may move between a closed position and an open position.

The one or more adhesive portions of the attachment arm member may be enclosed within the recess of the protective housing when the attachment arm member is in the closed position.

The one or more adhesive portions of the attachment arm member may be exposed to an external environment when the attachment arm member is in the open position.

Additional features and embodiments of the present general inventive concept will be apparent from the following detailed description, drawings, and claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 3 is a top view of the combined mount and protective case apparatus 100 illustrated in FIG. 1, wherein the attachment arm member is in a closed position;

FIG. 4 is a top view of the combined mount and protective case apparatus 100 illustrated in FIG. 1, wherein the attachment arm member is in an open position;

DETAILED DESCRIPTION

Figure 1:
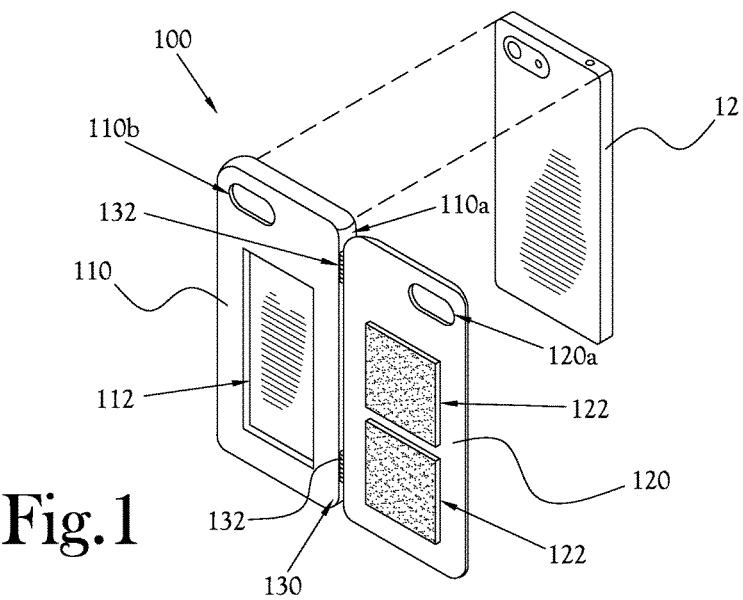
FIG. 1 is a back perspective view of a combined mount and protective case apparatus having an attachment member in an open position according to an exemplary embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept.

The present general inventive concept provides a protective case for an electronic device having an integrated mount which may be removably attached to a plurality of surfaces.

The combined mount and protective case according to the present invention may be configured or designed to accommodate and protect a wide variety of electronic devices including mobile phones, tablets, cameras, video players or the like.

The combined mount and protective case may comprise an enclosure or housing into which an electronic device such as a smart phone may be supported. The housing may be formed in one or more sections in order to enclose and protect the electronic device. The member may be formed from various materials and may be designed to enclose, store, and protect a plurality of hand-held electronic devices.

In an example embodiment, a hinge may connect a movable plate (i.e., attachment arm member) to a top, bottom, or side of the housing (i.e., protective housing member). The movable plate may include a first surface on which one or more adhesive or friction members are disposed and an opposing second surface which completes a contour or shape of the housing, when in a closed position. The first surface of the movable plate may be configured to be temporarily affixed or secured to a planar surface, such that the electronic device stored therein is secured at a desired location and/or orientation.

In alternative example embodiments, the hinge member may be arranged on any of the sides and/or surfaces of the housing. For example, a replaceable strip of adhesive and/or various other reusable adhesive members may be coupled to the first surface of the movable plate to detachably couple to a plurality of surfaces.

In the present embodiment, the first surface of the housing includes a low friction surface to which the adhesive will not adhere. The housing may further include a high friction surface to which the adhesive readily adheres. The adhesive member may be removed and/or replaced from the housing by firmly grasping an edge of the adhesive member and applying a force away from the housing.

In a further example embodiments, a pair of mounting rails and corresponding grooves may be provided along opposite sides of a recess formed in the housing to allow the movable plate slide from an open position to a closed position. In the closed position, the movable plate protects the adhesive member disposed within the recess from an external environment and debris. That is, when stored, the movable plate (e.g., attachment arm member) may be slid into an open position to expose the adhesive member and to the closed position to conceal and protect the adhesive member.

In example embodiments, the moveable plate (i.e., attachment arm member) may include both a pair of mounting rails and corresponding grooves and a hinge member such that the attachment member may be slid to expose the adhesive member and then rotated to allow the used to orient and temporarily secure the housing to a planar surface. The user may operate all functions and features of the electronic device stored within the housing without having to hold the housing in a desired orientation. That is, the user may then use the electronic device for example to take pictures, play audio and/or video media, play games, and the like. Once the user is finished with operating the electronic device, the user may then apply a force on the attachment arm member and/or the housing member is a direction away from the surface to remove the combined mount and protective case, according to the present general inventive concept. Specifically, the present general inventive concept provides a combined mount and protective case for a plurality of electronic devices configured and/or designed to temporarily mount (approx. 5 days without contact) for temporarily fastening an electronic device to an object or surface to take pictures or stream video. However, the present general inventive concept is not limited thereto.

Figure 2:
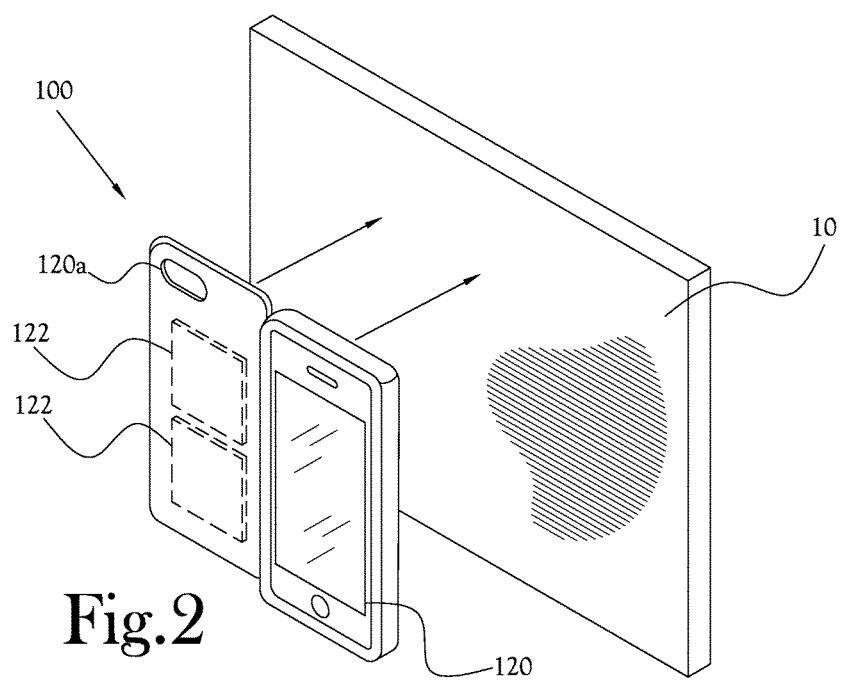
FIG. 2 is a front perspective view of the combined mount and protective case illustrated in FIG. 1 positioned on and a surface.

FIG. 1 is a back perspective view of a combined mount and protective case apparatus 100 having an attachment member in an open position according to an exemplary embodiment of the present general inventive concept. FIG. 2 is a front perspective view of the combined mount and protective case 100 illustrated in FIG. 1 positioned on and a surface 10.

Referring to FIG. 1, the combined mount and protective case 100 may include a protective housing member 110 designed and/or configured to enclose and protect an electronic device 12 and an attachment arm member 120 movably coupled to the protective housing member 110 with a coupling member 130. The attachment arm member 120 includes one or more adhesive portions 122 configured to detachably mount to a plurality of surfaces 10.

The protective housing member 110 may be formed in one or more sections in order to enclose and protect the electronic device 12. The protective housing member 110 may be formed from various materials and may be designed to enclose, store, and protect a plurality of hand-held electronic devices 12, such as personal digital assistants (PDAs), computers, tablets, notebooks, cameras, smartphones, mobile phones, cellular phones, music players, media players, video cameras, global positioning system devices, portable gaming consoles, and the like. However, the present general inventive concept is not limited thereto.

In alternative example embodiments, the protective housing 110 may be formed with ports 110b to allow a user to access and/or operate functions of the stored electronic device. Similarly, the attachment arm member 120 may also include a port 120a to allow a user to access and/or operate functions of the stored electronic device 12.

FIG. 3 is a top view of the combined mount and protective case apparatus 100 illustrated in FIG. 1, wherein the attachment arm member is in a closed position. FIG. 4 is a top view of the combined mount and protective case apparatus 100 illustrated in FIG. 1, wherein the attachment arm member 120 is in an open position.

Referring to FIGS. 3 and 4, the attachment arm member 120 may be configured to move (e.g., slide or rotate) with respect to the protective housing member 110 through the coupling member 130. The coupling member 130 may include a spring, a hinge, or rail and groove features coupled to a surface of the protective housing member 110 to allow the attachment arm member 120 to move from an open position to a closed position. However, the present general inventive concept is not limited thereto.

In the present exemplary embodiment, the coupling member 130 may be embodied as a hinge member 132 coupled to a surface 110a of the protective housing member 110. The hinge member 132 may be used to rotatably couple the attachment arm member 120 to the protective housing member 110 to allow the attachment arm member 120 to move between the open and closed positions. In addition, the hinge member 132 may be configured to rigidly support the attachment arm member 120 at a plurality of positions disposed between the open position and the closed position. That is, in the present exemplary embodiment, the hinge member 132 allows the attachment arm member 120 to rotate between the open position and the closed position to provide access to the one or more adhesive portions 122. In exemplary embodiments, the hinge member 132 may include various types of hinges including a friction hinge and a ratcheting hinge. However, the present general inventive concept is not limited thereto.

Referring to FIG. 3, in the closed position, the one or more adhesive portions 122 are sealed off from an external environment to protect the one or more adhesive portions 122 from debris and/or being exposed to air. In exemplary embodiments, the protective housing member 110 may further include a recess 112 formed in a surface of the protective housing member 110 to protect the one or more adhesive portions 122 from debris and/or air, when the attachment arm member 120 is in the closed position.

In exemplary embodiments, the recess 112 may be formed to accommodate the one or more adhesive portions 122 in order to prevent contact between the protective housing member 110 and the one or more adhesive portions 122.

In the open position, the one or more adhesive portions 122 are exposed to the external environment to allow the one or more adhesive portions 122 to be detachably affixed to a desired surface. That is, once the attachment arm member 120 is moved (e.g. rotated or slid) to the open position, a user may position the combined mount and protective case 100 on a surface 10 so that the electronic device 12 stored therein is positioned in a desired orientation. The user may then apply a force to the attachment arm member 120 to secure the one or more adhesive portions 122 to the surface 10. The user may then operate the electronic device 12 within the protective case 100, without needing to physically hold the electronic device 12 in place. As such, the user may be able to reduce fatigue and/or injury to his or her hand during prolonged operation of the electronic device 12.

In alternative exemplary embodiments, the attachment arm member 120 may be detachable from the combined mount and protective case 100 in order to replace the one or more adhesive portions 122. In the present exemplary embodiment, the one or more adhesive portions 122 may include a plurality of materials having a relatively high friction surface to be able to adhere or fasten to a plurality of surfaces. For instance, the protective case 100 according to the present general inventive concept allows the user to mount a camera in a desired orientation in order to capture an image or video of a group of individuals, including the user eliminating a need to request for third party assistance.

In addition, while travelling, the one or more adhesive portions 122 may detachably attach to a back surface of a seat or various other surfaces to allow the user hands-free operation and view of his or her electronic device 12. The user may then remove the combined mount and protective case 100 from the surface 10 by applying a force on the protective housing member 110 and/or the attachment arm member 120 in a direction away from the surface 10.

Figure 5:
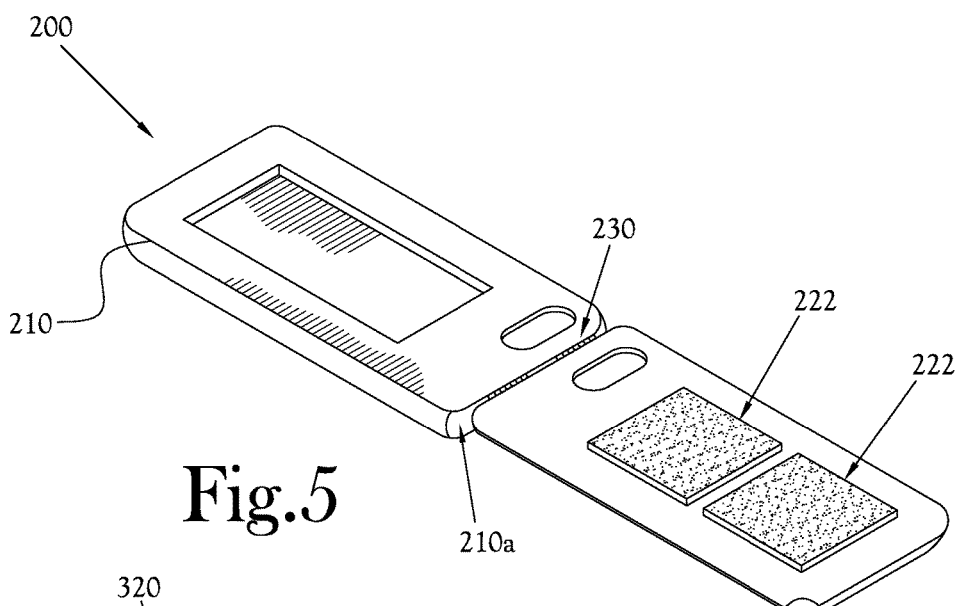
FIG. 5 is a back perspective view of a combined mount and protective case apparatus having an attachment member coupled to a top surface of the protective housing according to another exemplary embodiment of the present general inventive concept.

FIG. 5 is a back perspective view of a combined mount and protective case apparatus 200 having a movable attachment arm member 220 coupled to a top surface 210a of the protective housing 210 according to another exemplary embodiment of the present general inventive concept. The present exemplary embodiment includes the features and elements as described in the previous exemplary embodiments.

Referring to FIG. 5, the present example embodiment, the combined mount and protective case apparatus 200 may include a protective housing member 210 designed and/or configured to enclose and protect an electronic device 12 and an attachment arm member 220 movably coupled to the protective housing member 210 with a coupling member 230. The attachment arm member 220 includes one or more adhesive portions 222 configured to detachably mount to a plurality of surfaces 10. The combined mount and protective case apparatus 200 of the present embodiment further includes a coupling member 230 coupled to a top surface 210a of the protective housing 210 to allow the attachment arm 220 to rotate from a closed position to an open position.

Figure 6:
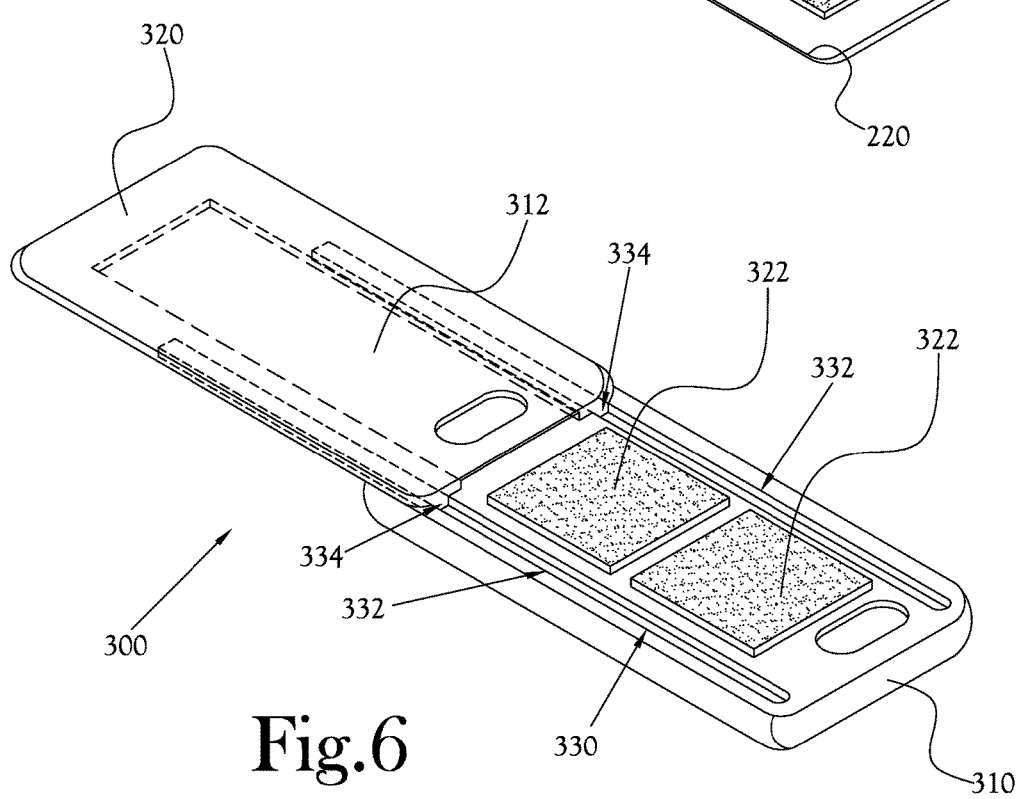
FIG. 6 is a back perspective view of a combined mount and protective case apparatus having an attachment member slid to an open position according to another exemplary embodiment of the present general inventive concept.

FIG. 6 is a back perspective view of a combined mount and protective case apparatus 300 having a movable attachment arm member 320 slid to an open position according to another exemplary embodiment of the present general inventive concept. The present exemplary embodiment includes the features and elements as described in the previous exemplary embodiments.

Referring to FIG. 6, the present example embodiment, the combined mount and protective case apparatus 300 may include a protective housing member 310 designed and/or configured to enclose and protect an electronic device 12 and an attachment arm member 320 movably coupled to the protective housing member 310 with a coupling member 330. The protective housing member 310 includes one or more adhesive portions 322 configured to detachably mount to a plurality of surfaces 10. The one or more adhesive portions 322 may be enclosed within a recess 312 formed within the attachment arm member 310 to protect the one or more adhesive portions 322 from debris and/or an external environment.

The combined mount and protective case apparatus 300 further includes a pair of grooves 332 formed within a surface of the protective housing 310 and a corresponding pair of rails 334 formed within a surface of the attachment arm member 320 to allow the attachment arm 320 to slide from a closed position to an open position.

The combined mount and protective case apparatus according to the present invention allows a user to removably attach an electronic device to a desired surface. The combined mount and protective case apparatus includes a protective enclosure to house, store, and protect the electronic device and a movable attachment arm member which is used to expose and/or conceal a rubber-like portion or adhesive portion attached to a surface of the movable attachment arm member. When the user opens the movable attachment member, the rubber-like portion or the adhesive portion is exposed and may be detachably fixed to the desired surface. The user may then operate functions of the electronic device, such as playing a video. Once complete, the user may remove the combined mount and protective case apparatus and close the movable attachment member, to thereby enclose and protect the rubber-like portion or the adhesive portion against a surface of the a protective enclosure.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

What is claimed is:

1. A combined mount and protective case apparatus for an electronic device, comprising:
    a protective housing member to store and protect an electronic device; and
    an attachment arm member having one or more adhesive portions configured to detachably mount to a plurality of surfaces, the attachment arm member rotatably connected to the protective housing member by a hinge member coupled to the protective housing member,
    wherein the protective housing member includes a recess formed in an outer surface thereof to enclose the one or more adhesive portions within the recess.

2. The apparatus of claim 1, wherein the hinge member rigidly supports the attachment member at a plurality of positions.

3. The apparatus of claim 1, wherein the attachment arm member rotates between an open position to expose the one or more adhesive portions and a closed position to seal off the one or more adhesive portions from an external environment.

4. The apparatus of claim 1, wherein the one or more adhesive portions of the attachment arm member is enclosed within the recess of the protective housing when the attachment arm member is in the closed position.

5. The apparatus of claim 4, wherein the one or more adhesive portions of the attachment arm member is exposed to an external environment when the attachment arm member is in the open position.

6. A combined mount and protective case apparatus for an electronic device, comprising:
    a protective housing member to store and protect an electronic device; and
    an attachment arm member having one or more adhesive portions configured to detachably mount to a plurality of surfaces, the attachment arm member slidably connected to the protective housing member by a coupling member coupled to the protective housing member,
    wherein the protective housing member includes a recess formed in an outer surface thereof to enclose the one or more adhesive portions within the recess.

7. The apparatus of claim 6, wherein the coupling member rigidly supports the attachment member at a plurality of positions.

8. The apparatus of claim 6, wherein the attachment arm member slides between a closed position and an open position.

9. The apparatus of claim 8, wherein the one or more adhesive portions of the attachment arm member is enclosed within the recess of the protective housing when the attachment arm member is in the closed position.

10. The apparatus of claim 9, wherein the one or more adhesive portions of the attachment arm member is exposed to an external environment when the attachment arm member is in open position.

11. A method of using a combined mount and protective case apparatus for an electronic device having a protective housing member to store and protect an electronic device and an attachment arm member having one or more adhesive portions configured to detachably mount to a plurality of surfaces, the attachment member movably connected to the protective housing member by a coupling member coupled to the protective housing member, wherein the protective housing member includes a recess formed in an outer surface thereof to enclose the one or more adhesive portions within the recess, the method comprising:
    moving the attachment arm member in a direction opposite of the protective housing member;
    placing the one or more adhesive portions against a planar surface; and applying a pressure to the one or more adhesive portions to detachably secure the protective housing member to the planar surface.

12. The method of claim 11, wherein the attachment arm member moves between a closed position and an open position.

13. The method of claim 12, wherein the one or more adhesive portions of the attachment arm member is enclosed within the recess of the protective housing when the attachment arm member is in the closed position.

14. The apparatus of claim 12, wherein the one or more adhesive portions of the attachment arm member is exposed to an external environment when the attachment arm member is in open position.

\* \* \* \* \*